(No Model.)
G. A. HYDE, Sr., & G. A. HYDE, Jr.
GAS PRESSURE REGULATOR.
No. 297,692. Patented Apr. 29, 1884.
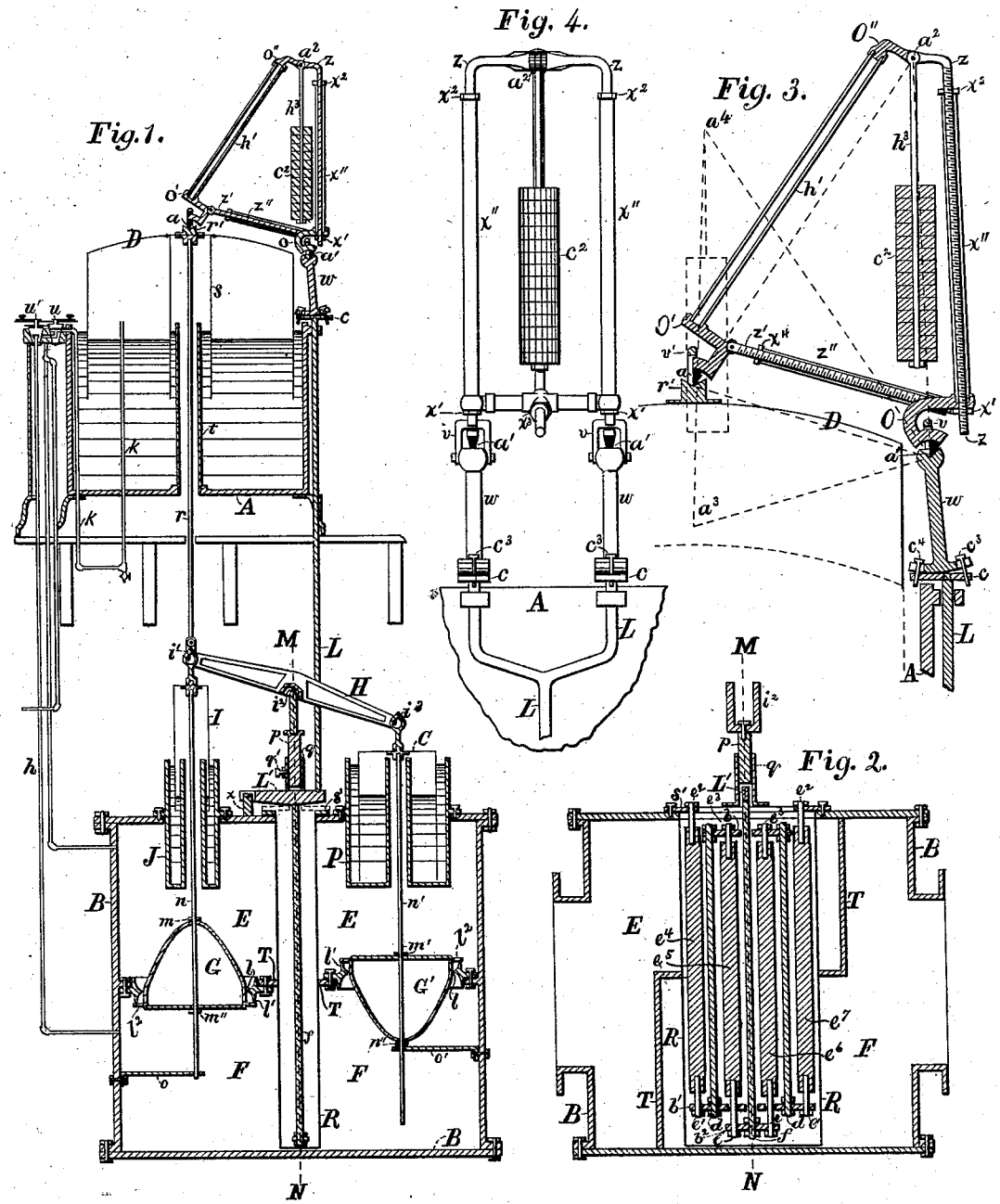
Witnesses:
Inventors.
Gustavus A Hyde Sr
Gustavus A Hyde Jr

UNITED STATES PATENT OFFICE.

GUSTAVUS A. HYDE, SR., OF CLEVELAND, OHIO, AND GUSTAVUS A. HYDE, JR., OF EAST SAGINAW, MICHIGAN.

GAS-PRESSURE REGULATOR.

SPECIFICATION forming part of Letters Patent No. 297,692, dated April 29, 1884.

Application filed January 2, 1884. (No model.)

*To all whom it may concern:*

Be it known that we, GUSTAVUS A. HYDE, Sr., of Cleveland, in the county of Cuyahoga and State of Ohio, and GUSTAVUS A. HYDE, Jr., of East Saginaw, in the county of Saginaw and State of Michigan, have invented an Improved Gas-Pressure Regulator; and we do hereby declare that the following is a full, clear, and exact description of the construction and working thereof, reference being had to the accompanying drawings through letters of reference marked thereon, forming part of this specification.

This invention relates to improvements in devices known as gas governors or regulators for street-mains and other large supply-pipes, and has for its object a more regular and automatic government than has heretofore been accomplished of the passage or flow of the gas from the gas-holder or general-supply station to the consumer under the many deranging influences which naturally occur.

Figure 1 represents a central vertical section of an apparatus embracing our improvements. Fig. 2 represents a vertical detached section of the casing B, taken through the line M N of Fig. 1. Fig. 3 represents an enlarged detached section of $a\ a'\ a^2$ of Fig. 1, and Fig. 4 represents a rear view of the same.

Similar marks of reference indicate corresponding parts in all of the figures.

B is a casing, placed so that the inlet E is in connection with the supply of gas from the gas-holder, and the outlet F is connected with the main distributing-pipe to the consumers. The valves G and G' are preferably of cone shape, of similar construction, and both suspended from the balancing-bar H by rods $n$ and $n'$. The valves G and G', with rods $n$ and $n'$, and balancing-bar H are connected to and operated by the float D through the rod $r$. The float D is in turn operated by the pressure supplied through the pipes $k$ and $h$, and rises and falls in the casing A, which is kept nearly filled with water. Float D is also supplied with the tube $s$, substantially as shown, to form a seal over the pipe $t$ and rod $r$, thus preventing any direct connection between the float-chamber of the float D and the outer air. In ordinary automatic operation the pipe $k$ is in open connection with the pipe $h$ through valves $u$ and $u'$. Thus the float D will be operated by the resultant pressure at F in casing B. The fulcrum of the balancing-bar H is made adjustable by the rod $p$, standard $q$, and screw $q'$. The three working-bearings $i'\ i^2\ i^3$ are sharp blades, preferably; but any suitable bearing may be used. The rod $n$ is supplied with a sealed tubing, I, in connection with the annular tubing J, substantially as shown, to form a seal and allow the free operation of the rod and prevent escape of gas at that point; and the rod $n'$ is similarly supplied with tube C and annular tubing P, and for the same purpose, but with larger diameter, in order to expose greater lifting-surface to the initial pressure.

$o$ and $o'$ are guides for valve-rods $n$ and $n'$, to keep valves G and G' from coming in contact with the gage-rings $l\ l$.

$l'$ and $l'$ are sharp-edged seats for the projecting flanges $l^2\ l^2$ of the valves G G' to rest against when closed.

In Figs. 1 and 2, T is a partition separating the inlet-chamber E from the outlet-chamber F. R is a sheet-metal casing, flanged at the upper end and suspended from the top side of the casing B, and passing through the partition T. On the inside it has no gas-connection with the chambers E and F. L' is a lever, pivoted with pillar $x$, resting on rod $f$, and sustaining rod L, which in turn sustains the plate $c$. $e$, $e'$, $e^2$, and $e^3$ are bolts attached to wooden rods $e^4$, $e^5$, $e^6$, and $e^7$. $e\ e$ are also secured to plate $b^2$, $e'\ e'$ to plate $b'$, $e^2\ e^2$ to plate $s'$, and $e^3\ e^3$ to plate $b$. Rod $f$ is secured to plate $b^2$, and passes freely through plates $b$ and $b'$, and bolts $e\ e$ pass freely through the plate $b'$. Rods $f$, $d$, and $d$ are metal. $f$ is secured to the plate $b^2$, and $d\ d$ are secured to plates $b$ and $b'$.

In Fig. 3, $a$, $a'$, and $a'$ are V-shaped pointed supports resting in V-shaped bearings $r'$ and $w\ w$. The bearing $r'$ is in the center of the float D, and $w\ w$ are standards laterally adjustable on plates $c\ c$ by the screw-bolts $c^3$ and $c^4$, as shown. The arm $h'$ is a tube permanently attached to the fittings O' O''. The arms $x''$ $x''\ z''$ are tubes inclosing threaded rods $z\ z$ and $z'$, respectively, which are provided with nuts $x'$, $x'$, $x^2$, $x^2$, $x^3$, and $x^4$, as shown. The rod $z'$ is pivoted to the fitting O', as shown. The pendent rod $h^3$, with the weight $c^2$, is pivoted with the fitting O'', and the threaded rods $z$ $z$ at $a^2$, as shown. The stops $v$ $v$ and $v'$ are to prevent the pointed supports $a$, $a'$, and $a'$ from lifting out of their bearings $r'$, $w$, and $w$.

Having described the various parts of our invention, we will describe its operation.

As is commonly known, on account of the accelerated or retarded velocity with which the gas flows as the consumption increases or decreases, the friction thereby created in the pipes is respectively increased or lessened. To counteract the variation in friction so caused and insure a nearly uniform pressure to the more distant consumer, it is found necessary to vary the pressure at the governor. This is accomplished in the following manner: The casing A and annular tubings J and P are nearly filled with water. Assuming that the valves G and G' are open, and the float D resting on the bottom of casing A, gas is let into the inlet E, and passes through the openings made for the valves G and G', and passes out through the outlet-opening F. The pressure of the gas conveyed through the pipe $h$, regulating-cocks $u'$ $u$, and pipe $k$ lifts the float D and throws the triangular weight-adjuster $a$ $a'$ $a^2$ from its position $a^3$ $a^4$ to its position $a$ $a^2$, and also lifts the valve G and depresses the valve G' to their positions, as shown. The consumption of gas then commencing, the pressure of the gas below the valves G and G' is decreased in the outlet-chamber F, and also in the float D, through the pipes $h$ and $k$, causing it to fall, and this in turn causing the opening of the valves G and G', and allows gas to pass from the chamber E to chamber F to meet the demand for gas, and at the same time the triangle $a$ $a'$ $a^2$ is depressed at the point $a$, causing a movement of the pendulum-weight $h^3$ toward $a^4$, resulting in applying weight on the float D and keeping the valves G and G' open. When the consumption of gas decreases, the reverse action is had, the valves G and G' being closed and the weight thrown off, the result being not only to open and close the valves automatically, as required, but to also increase and decrease the pressure to the extent of the resisting friction in the distributing-pipes.

The two valves G and G' are used in connection by means of the balance-bar H for the purpose of balancing their weight, thus allowing the use of a much smaller float D than is usual, and also to balance the action of the force of the gas as it passes rapidly by and over the valves, and to balance the effect of the constantly-changing pressure above and below either valve. This arrangement of valves in connection with the V-shaped bearings $i'$ $i^2$ $i^3$ we regard as important elements in the free action of the governor, and form an important part of our invention.

We have observed that in localities where the gas is consumed at a higher level than the governor the difference in the pressure caused by the difference in elevation is affected by the variation in the temperature of the gas. To counteract this disturbing influence, we have designed the apparatus shown in Fig. 2. In the passage of gas from chamber E to F its temperature is imparted to the metal casing R and the rods contained therein. The rods $e^4$, $e^5$, $e^6$, and $e^7$, being of wood, are not affected lengthwise by the temperature; but the rods $f$, $d$, and $d$, being of metal, are affected by the temperature. If the temperature is increased, the rods $f$, $d$, and $d$ are expanded, and plate $b'$ being suspended on the wood rods $e^4$ and $e^7$, $d$ and $d$ will raise the plate $b$, and consequently the wood rods $e^5$ and $e^6$ and plate $b^2$ will be raised, and in turn the rod $f$, being attached to the plate $b^2$, will also be raised. The expansion or raising imparted to lever L', as shown, is thereby increased in its effect on the rod L by having lever L' pivoted with the standard $x$, as shown. The raising of the rod L causes a movement of the pendulum-weight $h^3$ toward $a^4$, resulting in adding weight to the float D and opening the valves G and G' and increasing the pressure the same amount that it had been reduced by the raising of the temperature of the gas.

The fact of the affecting of the pressure of the gas in the manner as above mentioned has, we believe, never before been recognized, and this device, to our knowledge, is the first that has ever been designed for that purpose.

Where telescopic gas-holders are in use, when the two sections couple, the pressure is very materially increased, and the reverse result is obtained in an equal degree, when they uncouple. The gas-holder weighing less in than out of water also affects the pressure. The friction produced by the flow of gas from the gas-holder to the governor also decreases the pressure at the governor as the velocity increases. These fluctuations of pressure from these causes tend to derange the otherwise correct working of the governor by forcing more gas through the valves when at high initial pressure, thereby temporarily increasing the resultant pressure. This increased resultant pressure in turn, in a governor with an attachment for automatically increasing and decreasing the weight on the valve, throws off a part of the weight. Therefore, when the initial pressure is increased, the resultant pressure is to a certain extent decreased, and the reverse result is true of a reverse fluctuation in the initial pressure. To remedy this difficulty, in Fig. 1 the tubing C is made larger than the tubing I, presenting greater lifting-surface to the initial pressure, so that when the initial pressure is increased in the chamber E, naturally decreasing the resultant pressure, the tube C, being larger than the tube I, applies more lifting-power to the $i^3$ end of the lever H than the tube I does to the $i'$ end. This allows the rod $r$ and float D to fall, depressing the point $a$, moving the weight $c^2$ toward $a$, resulting in applying weight to the rod $r$ $n$ and sustaining the opening of the valves G and G'.

We believe that this device is the first that has ever been designed to correct the disturbance in the initial pressure.

What we claim as our invention, and desire to secure by Letters Patent, is—

1. In a gas-pressure governor or regulator, the adjustable weight $c^2$, together with the vibrating pendent rod $h^3$, suspended from the triangular adjustable frame O O' $z$ $x'$, having V-shaped or sharp-pointed supports $a$ $a'$ $a'$, secured in V-shaped bearings $r$ $w$ $w$ by stops $v$ $v$ $v'$, in combination with the float D, rods $r$, $n$, and $n'$, and valves G and G', substantially as shown, and for the purpose set forth.

2. The two valves G and G', having projecting rings $l^2$ $l^2$, sharp-edged gage-rings $l$ $l$, and sharp-edged seats $l'$ $l'$, in combination with rods $n$, $n'$, and $r$, tubings I and C, balancing-bar H, float D, triangular adjustable frame O O' $z$ $x'$, vibrating pendent rod $h^3$, and adjustable weight $c^2$, substantially as shown, and for the purpose set forth.

3. The tubing C and its annular tubing P, having greater diameter than the tubing I and its annular tubing J, in combination with the rods $n$, $n'$, and $r$, balancing-bar H, valves G and G', with float D, triangular adjustable frame O O' $z$ $x'$, and vibrating pendent rod $h^3$, and adjustable weight $c^2$, substantially as shown, and for the purpose set forth.

4. The balancing-bar H, fulcrumed at its center and connected with rods $n$, $n'$, and $r$, with sharp-edged bearings $i'$ $i^2$ $i^3$, and having an adjustable fulcrum-pillar, $p$, in combination with tubings I and C, valves G and G', float D, and triangular adjustable frame O O' $z$ $x'$, substantially as shown and described.

5. A varying-temperature regulator composed of alternate wood and iron rods $e^4$ $d$ $e^5$ $f$ $e^6$ $d$ $e^7$, inclosed in casing R, and connected to lever L' and rod L, in combination with triangular adjustable frame O O' $z$ $x'$, float D, rods $r$, $n$, and $n'$, valves G and G', tubings I and C, and balance-bar H, substantially as shown, and for the purpose set forth.

In testimony whereof we affix our signatures in the presence of two subscribing witnesses.

GUSTAVUS A. HYDE, SR.
GUSTAVUS A. HYDE, JR.

Witnesses as to the said Gustavus A. Hyde, Sr.:

C. M. VORCE,
R. R. HOLDEN.

Witnesses as to the said Gustavus A. Hyde, Jr.:

HARLAN P. SMITH,
GEORGE F. MOORE, Jr.